July 14, 1953     D. E. CROOKER     2,644,984
APPARATUS FOR MANUFACTURING TIRE TREADS
Filed Oct. 1, 1948
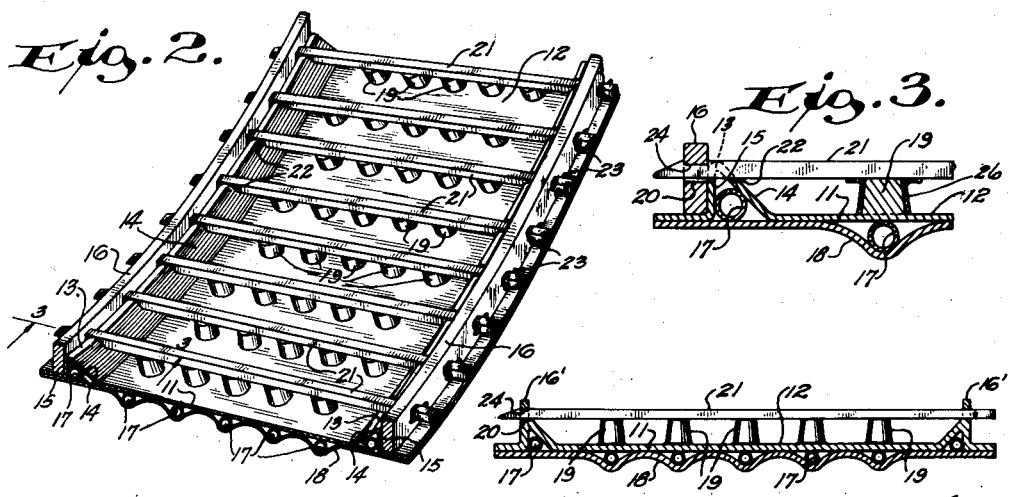
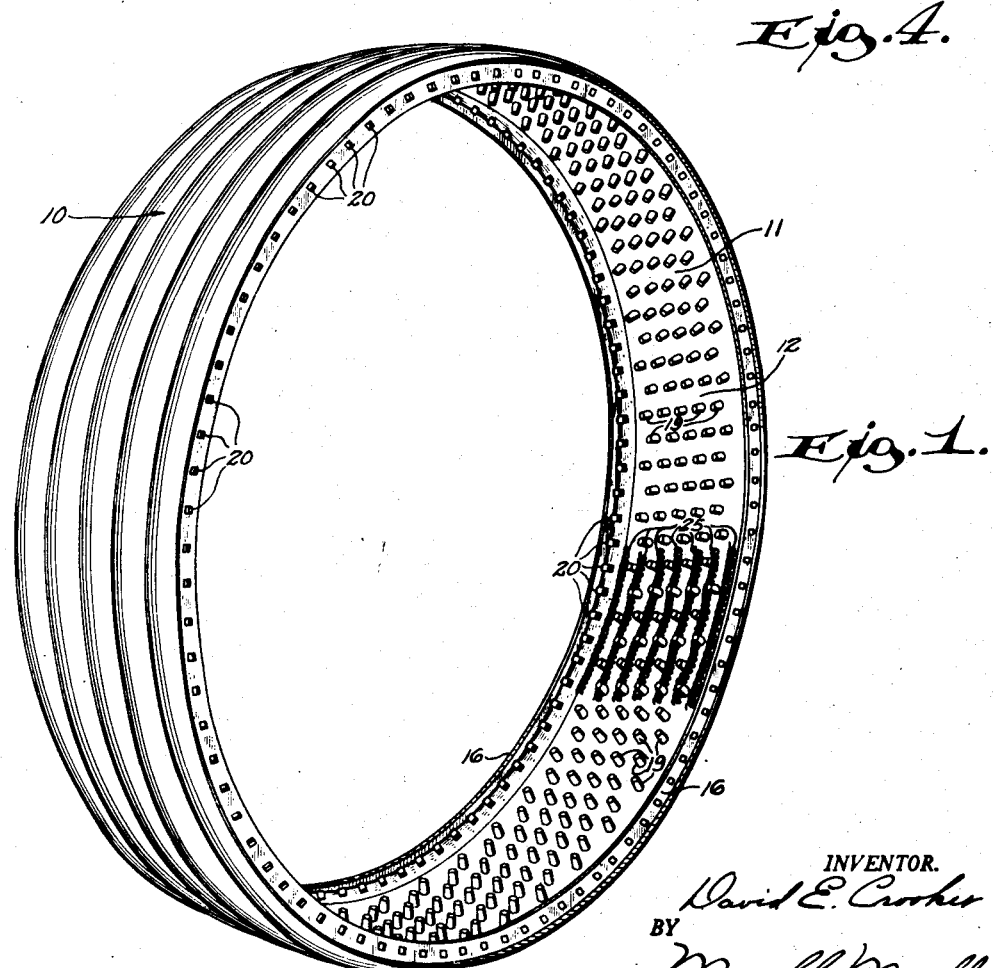
INVENTOR.
David E. Crooker
BY
Morsell & Morsell
ATTORNEYS.

Patented July 14, 1953

2,644,984

UNITED STATES PATENT OFFICE 2,644,984

APPARATUS FOR MANUFACTURING TIRE TREADS

David E. Crooker, Ontonagon, Mich., assignor of one-half to Lloyd L. Felker, Marshfield, Wis.

Application October 1, 1948, Serial No. 52,198

13 Claims. (Cl. 18—44)

This invention relates to improvements in apparatus for manufacturing tire treads.

As a result of experimentation with various tires, certain types of constructions have been found to have definite advantages over conventional arrangements. The ventilated tire of the type shown in my copending application Serial No. 46,909, now Patent No. 2,540,043, is designed to run at a considerably lower temperature than the usual type of tire. Another type of tread construction which gives favorable results is the non-skid tire shown as the principal form of invention in my copending application Serial No. 52,199, now Patent No. 2,540,044, wherein metal traction augmenting members in the form of metal coils are embedded in the tread thereof. Both of the above types have smooth road contacting surfaces in which are formed a plurality of cup-shaped recesses. A third type of tire found to have particular merit is that shown as a modification in my copending application Serial No. 52,199, wherein both the ventilating features of the first of the above types is combined with the non-skid features of the second. A fourth type of tire which has been found to have considerable merit is that shown in my copending application Serial No. 52,200, now Patent No. 2,540,045, wherein the ventilating features of the tire shown in my application Serial No. 46,909 are combined with the non-skid features provided by metal traction augmenting members in the form of sleeves embedded radially in the tire tread. The manufacture of the above-mentioned types of tires has presented problems which the present invention is designed to solve.

The original manufacture of a tire and a retreading operation are very similar. In fact, the retreading operation involves some of the same steps as original tire manufacture, and during these steps, very similar equipment is employed. In the curing stage of both operations the tire casing surrounds an inflatable annular core and is surrounded by a steam jacketed annular matrix. The core is adapted to be inflated and the pressure therefrom similar to the pressure in an inflated inner tube forces the uncured rubber of the tire against the hot matrix. The matrix is formed on its tire engaging surface with a contour which corresponds to the contour desired on the finished tire. The uncured rubber is then forced into the pattern of the matrix, and after a predetermined period of exposure to the heat and pressure abovementioned, the curing of the rubber is complete and the tire is removed from the matrix.

In the manufacture of ventilated tire treads difficulty has been heretofore encountered in forming passages through the tread underlying the tread surface. In the manufacture of non-skid tires having embedded therein metal coils, difficulty has also been encountered in maintaining the metal coils in their proper position during the curing operation. Similar difficulty has been encountered with respect to the manufacture of non-skid tire treads having metal sleeves embedded therein.

With the above in mind, a general object of the invention is to provide an improved apparatus for manufacturing tire treads of the ventilated type hereinbefore described either with or without traction augmenting features.

A further object of the invention is to provide an improved apparatus for the manufacture of ventilated tire treads wherein transverse rods removably carried by the annular matrix provide means for forming the transverse ventilating passages in the tire.

A further object of the invention is to provide an improved apparatus for the manufacture of ventilated tire treads wherein the matrix has a substantially cylindrical tire engaging surface which has formed thereon a plurality of substantially parallel rows of tapered pegs, the inner ends of which are in engagement with the transverse rods, thereby providing a matrix pattern for the purpose of forming a tire having a smooth tread surface with a plurality of parallel rows of cup-shaped recesses therein, said recesses being in communication at their inner ends with transverse ventilating passages.

A further object of the invention is to provide an annular tire matrix wherein the pegs projecting from the tire contacting surface thereof provide means for securely holding metal coils in said matrix, during a tire curing operation, said pegs in conjunction with transverse rods also being selectively operable to securely hold metal sleeves in said matrix during a tire curing operation.

A further object of the invention is to provide an improved construction for the rods which are used in the improved tire matrix, said construction providing means for maintaining said rods in position regardless of the position of the matrix, and also permitting quick removal of the rods from the matrix upon completion of the curing operation.

A further object of the invention is to provide an improved matrix construction which is applicable to either a single ring type of mold or to a two piece split mold.

With the above and other objects in view, the invention consists in the improved apparatus for manufacturing tire treads, and all of its parts and combinations, as set forth in the claims, and all equivalents thereof.

A clear conception of the improved apparatus may be had by referring to the drawing accompanying and forming a part of this specification, wherein like reference characters designate the same parts in all of the views:

Fig. 1 is a perspective view of a single ring type of jacketed mold or matrix constructed in accordance with the invention;

Fig. 2 is a fragmentary perspective view on an enlarged scale and partly in section of the matrix of Fig. 1 with transverse rods in position;

Fig. 3 is a fragmentary transverse vertical sectional view taken along the line 3—3 of Fig. 2; and Fig. 4 is a transverse vertical sectional view of a modified form of single ring mold or matrix.

Referring more particularly to the drawing, the numeral 10 indicates a single ring type of jacketed tire mold or matrix which is constructed in accordance with the present invention. Referring to Figs. 2 and 3, the mold 10 consists of a substantially cylindrical ring or matrix 11 having a smooth inner or tire contacting surface 12. At each side of the inner surface 12 the ring 11 is formed with an inwardly projecting annular rib 13, which has a sloping portion 14 and a portion 15 which extends at substantially right angles to the surface 12. The portion 14 is sloped at the proper angle to shape the side surfaces of the tread of a tire. Projecting inwardly from the ring 11 and positioned outwardly of each of the portions 15, as shown in Figs. 2 and 3, are a pair of annular flanges 16.

A plurality of conduits 17 encircle the ring 11 in heat exchange relation therewith, there preferably being conduits within the portions 13, as shown. A shell or jacket 18 encloses the ring 11 and the conduits 17, and maintains the whole in assembled relationship. Suitable connections (not shown) preferably lead from the conduits 17 to a source of steam under pressure.

Formed on the surface 12 of the ring 14 is a plurality of metal pegs, preferably tapered, which project radially inwardly therefrom. The pegs 19 preferably have flat inner end surfaces and are preferably all of the same height. They are preferably arranged in a plurality of obliquely extending substantially parallel transverse rows.

The flanges 16 are formed with a plurality of apertures 20, preferably square, which are adapted to receive square rods 21. The apertures 20 are preferably of the same size and shape as the cross-sectional shape of the rods 21, and are positioned so that when the rods 21 are held therein, said rods are each aligned with a row of the pegs 19 and have a flat surface in engagement with the end surfaces of all of the pegs 19 in said row, as shown in Fig. 2. It will be noted that the portions 13 of the ring 11 are cut away adjacent each aperture 20 as at 22 (see Fig. 3), to permit the rods 21 to be inserted in position adjacent the tops of the pegs 19.

Each of the rods 21 is preferably provided at one end with a pin 23 extending therethrough to aid in removal and insertion of the rod relative to the apertures 20 in the flanges 16. Near their opposite ends the rods 21 are preferably formed with a rectangular notch 24 which has a width approximately equal to the thickness of the flanges 16. The rods 21 are preferably formed with a tapered end outwardly of the notch 24 to facilitate insertion of said rods into the apertures 20. The apertures 20 in the flange 16 into which the bevelled ends of the rods 21 are inserted are preferably positioned slightly outwardly (or below as shown in Fig. 3) the corresponding apertures in the opposite flange as shown in Fig. 3. With this construction, as the rods 21 are slipped into the apertures 20, each notch 24 will snap into latching engagement with the upper margin of an aperture 20 as shown in Fig. 3, and the rod 21 will be securely held in this position. This latching action takes place by reason of the fact that the rods 21 are bent slightly as they are slipped into position, and as the notches 24 register with their coacting apertures, the rods return to their normal shapes. The rods 21 cannot be removed without depressing the bevelled ends thereof to bring the notches 24 out of engagement with the margin of the apertures 20 with which they are in engagement. This positive engagement of the rods 21 as they are carried by the flanges 16 permits the mold 10 to be placed in any desired position with no danger of displacement of the rods 21.

Fig. 4 shows a modified form of mold 10 wherein a flange 16 is formed integral with the portion 13 of a ring such as that shown in Fig. 2. This modified construction is slightly more simple and is lighter in weight than the construction shown in Figs. 1, 2 and 3.

The mold 10 and the rods 21 may be used in the manufacture of a number of types of tires, some of which are those disclosed in my copending applications Serial Nos. 46,909, 52,199, and 52,200. Where a ventilated tire of the type shown in my copending application Serial No. 46,909 is desired, the mold 11 and the rods 21 are used as shown in Fig. 2.

Where a tire of one of the types shown in my copending application Serial No. 52,199 is desired, a plurality of metal coils 25 are cut to a length slightly greater than the inner circumference of the ring 11. In a mold such as the mold 10 five of the coils 25 are threaded in a wavy conformation between the pegs 19 as disclosed in the fragmentary showing thereof in Fig. 1. One of the coils 25 is also positioned within the ring 11 and adjacent each of the portions 13 thereof and extending substantially parallel with the flanges 16 as shown in Fig. 1. Depending upon whether or not transverse ventilating passages are desired, the rods 21 may or may not be used in conjunction with the mold 10 and the metal coils 25. Regardless of whether or not the rods 21 are used, the springs 25 are held firmly in position by reason of their frictional contact with the pegs 19 and by reason of the fact that they are under slight compression (having been cut slightly longer than the space which they occupy when in position).

Where a tire of the type shown in my copending application, Serial No. 52,200 is desired, the mold 10 and the rods 21 are used as shown in Fig. 2, and in addition a flanged metal sleeve 26 is placed on each peg 19 as shown in Fig. 3. The rods 21 hold the sleeves 26 in position during the curing operation.

After the mold 10 has been prepared for the manufacture of one of the abovementioned types of tire treads in the manner indicated for the desired type, a tire to be retreaded (not shown) is prepared for the curing operation. This involves placing an inflatable annular bag or core therein, mounting the tire on a suitable rim, smoothing off the wearing surface of the tire, and then cementing to the smoothed surface a layer of uncured rubber or "camelback." The tire is then placed in the prepared mold 10 in a position coaxial with said mold and in transversely centered alinement therewith.

Steam is then introduced into the conduits 17, and the annular core or bag within the tire is inflated. The expanding pressure created by the core expands the tire casing and forces the uncured rubber "camelback" into contact with the matrix pattern formed by the surfaces 11 and 15, the pegs 19 and the predetermined arrangement of the coils 25, rods 21, or sleeves 26. Under the heat from the steam in the conduits 17, and under the pressure from the core within the tire, the uncured rubber of the "camelback" flows around the members forming the matrix pattern. With continued application of predetermined amounts of heat and pressure for a predetermined period of time, the uncured "camelback" becomes cured. After the "camelback" has been cured, the steam is shut off from the conduits 17. If the rods 21 have been used, they are then removed by depressing the bevelled ends thereof, to disengage the notches 24 from the margins of the coacting apertures 20 and by then pulling the rods out by engaging the ends thereof. The bag or core within the tire is then deflated and the tire is removed from the mold 10. Upon removal of the tire from the rim and removal of the deflated core from the tire, the tire is ready for use.

By using the novel apparatus disclosed herein, any one of the number of new and improved tire treads can be manufactured quickly and easily. While only a single ring type of mold is shown, the improved features of this invention are readily applicable to a two piece split mold or the like.

Various changes and modifications may be made without departing from the spirit of the invention, and all of such changes are contemplated as may come within the scope of the claims.

I claim:

1. In a tire mold, a matrix having a tire molding surface, a plurality of pegs formed on said surface and projecting inwardly therefrom, an annular flange projecting inwardly from said matrix adjacent each edge of said tire molding surface, said flanges being formed with a plurality of apertures, a plurality of rods removably extending through the apertures of said flanges, said apertures being so positioned that each rod engages the inner ends of a plurality of pegs.

2. In a tire mold, a matrix having a tire molding surface, a plurality of pegs formed on said surface and projecting inwardly therefrom, said pegs being arranged in transversely extending rows, an annular flange projecting inwardly from said matrix adjacent each edge of said tire molding surface, said flanges being formed with a plurality of apertures, a plurality of rods removably carried in the apertures of said flanges, said apertures being so positioned that each rod is aligned with a row of pegs and in engagement with the inner ends thereof.

3. In a tire mold, a matrix having a substantially smooth tire molding surface, a plurality of pegs formed on said surface and projecting inwardly therefrom, an annular flange projecting inwardly from said matrix adjacent each edge of said tire molding surface, said flanges being formed with a plurality of apertures, a plurality of rods removably carried in the apertures of said flanges, means for locking said rods in assembled position in said apertures, said apertures being so positioned that each rod engages the inner ends of a plurality of pegs.

4. In a tire mold, a matrix having a substantially cylindrical tire molding surface, a plurality of pegs formed on said surface and projecting inwardly therefrom, said pegs being arranged in transversely extending rows, an annular flange projecting inwardly from said matrix adjacent each end of said tire molding surface, said flanges being formed with a plurality of apertures, a plurality of rods removably carried in the apertures of said flanges, means for locking said rods in assembled position in said apertures, said apertures being so positioned that each rod is alined with one of said rows of pegs and in engagement with the inner ends thereof.

5. In a tire mold, a matrix having a substantially smooth tire molding surface, a plurality of pegs formed on said surface and projecting inwardly therefrom, said pegs each having a flat inner end surface, an annular flange projecting inwardly from said matrix adjacent each end of said tire molding surface, said flanges being formed with a plurality of apertures, a plurality of rods each having at least one flat surface, said rods being removably carried in the apertures of said flanges, said apertures being so positioned and shaped that each rod is alined with at least one of said pegs and has its flat surface in contact with the flat end surface of said peg.

6. In a tire mold, a matrix having a substantially cylindrical tire molding surface, a plurality of pegs formed on said surface and projecting inwardly therefrom, said pegs having a flat inner end surface and being arranged in transversely extending rows, an annular flange projecting inwardly from said matrix adjacent each edge of said tire molding surface, said flanges being formed with a plurality of apertures, a plurality of rods, each having at least one flat surface, said rods being removably carried in the apertures of said flanges, said apertures being so positioned and shaped that each rod is alined with one of said rows of pegs and has its flat surface in contact with the flat end surfaces of the pegs of said row.

7. In a tire mold, a matrix having a substantially cylindrical tire molding surface, a plurality of tapered pegs formed on said surface and projecting inwardly therefrom, said pegs having a flat inner end surface and being arranged in transversely extending rows, an annular flange projecting inwardly from said matrix adjacent each edge of said tire molding surface, said flanges being formed with a plurality of substantially square apertures, a plurality of rods having substantially square cross section of substantially the same size as that of said apertures, said apertures being so positioned that each rod is alined with one of said rows of pegs, each rod having a flat surface in contact with the flat end surfaces of the pegs with which it is alined.

8. In a tire mold, a matrix having a substantially cylindrical tire molding surface, a plurality of pegs formed on said surface and projecting inwardly therefrom, an annular flange projecting inwardly from said matrix adjacent each end of said tire molding surface, said flanges being formed with a plurality of apertures, a plurality of rods removably carried by said flanges in said apertures, said rods being formed near one end with a notch and having a bevelled tip outwardly of said notch, said apertures being so positioned that each rod is in engagement with the end of at least one of said pegs, the apertures in the flange through which the notched ends of the rods extend being offset slightly outwardly from those of the other flange to provide a latching coaction between the notches of the rods and the margins of the apertures through which they extend, thereby preventing displacement of the rods from their assembled position.

9. In a tire mold: a matrix having a tire molding surface which is straight in an axial direction; a plurality of pegs of substantially equal length formed on said surface and projecting inwardly therefrom; a plurality of transversely extending rods in engagement with the inner ends of said pegs and extending substantially parallel with said molding surface; and means in said mold for removably supporting said rods in said positions.

10. In a tire mold: a matrix having a substantially smooth tire molding surface which is straight in an axial direction; a plurality of pegs formed on said surface and projecting inwardly therefrom; a plurality of transversely extending rods removably positioned in engagement with the inner ends of said pegs and extending substantially parallel with said molding surface; and means adjacent each edge of the tire molding surface for removably supporting the ends of said rods.

11. In a tire mold: a matrix having a substantially smooth tire molding surface which is straight in an axial direction; a plurality of pegs formed on said surface and projecting inwardly therefrom; and a plurality of transverse rods removably positioned in engagement with the inner ends of said pegs and extending substantially parallel with said molding surface, said mold being formed with a plurality of apertures through which said rods removably extend.

12. In a tire mold, a matrix having a tire molding surface, a plurality of transversely extending rods, each rod having an elongated surface which faces the molding surface with all parts of said elongated surface spaced substantially equally from said molding surface to engage the inner ends of traction augmenting members which are positioned between said elongated rod surfaces and said molding surface, holders projecting inwardly from said molding surface and positioned to cooperate with said rods in supporting said traction augmenting members, and means in said mold for removably supporting said rods in position.

13. In a tire mold, a matrix having a tire molding surface: a plurality of pegs of substantially equal length formed on said surface and projecting inwardly therefrom; a plurality of transversely extending rods having inner elongated surfaces which face the molding surface with all portions of said elongated surfaces substantially equally spaced from said molding surface a distance substantially equal to the length of a peg so that said elongated surface of each rod engages the inner ends of said pegs, and means in said mold for removably holding said rods in position.

DAVID E. CROOKER.

References Cited in the file of this patent

UNITED STATES PATENTS

| Number | Name | Date |
| --- | --- | --- |
| 782,000 | Buzby | Feb. 7, 1905 |
| 1,223,726 | Overman | Apr. 24, 1917 |
| 1,380,320 | Hufford | May 31, 1921 |
| 1,599,772 | Krusemark | Sept. 14, 1926 |
| 1,604,452 | Krusemark | Oct 26, 1926 |
| 2,267,406 | Krusemark | Dec. 23, 1941 |